US006775054B1

(12) United States Patent
Smith et al.

(10) Patent No.: US 6,775,054 B1
(45) Date of Patent: Aug. 10, 2004

(54) IMAGE-ROTATING, 4-MIRROR, RING OPTICAL PARAMETRIC OSCILLATOR

(75) Inventors: Arlee V. Smith, Albuquerque, NM (US); Darrell J. Armstrong, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 228 days.

(21) Appl. No.: 10/217,853

(22) Filed: Aug. 12, 2002

(51) Int. Cl.[7] .............................................. G02F 1/39
(52) U.S. Cl. ...................................... 359/330; 359/326
(58) Field of Search ................................ 359/326–332

(56) References Cited

U.S. PATENT DOCUMENTS

| 5,390,211 | A | | 2/1995 | Clark et al. ..................... 372/95 |
| 5,781,571 | A | | 7/1998 | Nabors et al. .................. 372/21 |
| 6,147,793 | A | | 11/2000 | Alford et al. ................. 359/330 |
| 6,647,033 | B1 | * | 11/2003 | Smith et al. ..................... 372/21 |
| 6,647,034 | B1 | * | 11/2003 | Smith et al. ..................... 372/21 |

OTHER PUBLICATIONS

Anstett, G., Göritz, G., Kabs, D., Urschel, R., Wallenstein, R., and Borsutzky, A., "Reduction of the spectral width and beam divergence of a BBO–OPO by using collinear type–II phase matching and back reflection of the pump beam," 2001, Appl. Phys. B, 72, 5, 583–589.

Smith, A. and Bowers, M., "Image–rotating cavity designs for improved beam quality in nanosecond optical parametric oscillators," May 5, 2000, presented at University of Kaiserslautern, Kaiserslautern, Germany.

Hansson, G., Karlsson, H., and Laurell, F., Unstable resonator optical parametric oscillator based on quasi–phase–matched RbTiOAsO$_4$, 2001, Appl. Optics, 40, 30, 5446–5451.

Johnson, B., Newell, V., Clark, J., and McPhee, E., "Narrow–bandwidth low–divergence optical parametric oscillators for nonlinear frequency–conversion applications," 1995, J. Opt. Soc. Am. B, 12, 11, 2122–2127.

* cited by examiner

Primary Examiner—John D. Lee
(74) Attorney, Agent, or Firm—Elmer A. Klavetter

(57) ABSTRACT

A device for optical parametric amplification utilizing four mirrors oriented in a nonplanar configuration where the optical plane formed by two of the mirrors is orthogonal to the optical plane formed by the other two mirrors and with the ratio of lengths of the laser beam paths approximately constant regardless of the scale of the device. With a cavity length of less than approximately 110 mm, a conversion efficiency of greater than 45% can be achieved.

13 Claims, 3 Drawing Sheets

IMAGE-ROTATING, 4-MIRROR, RING OPTICAL PARAMETRIC OSCILLATOR

This invention was made with Government support under Contract No. DE-AC04-94AL85000 awarded by the Department of Energy. The Government has certain rights in the invention.

BACKGROUND OF THE INVENTION

The invention relates to an optical parametric oscillator and more particularly to an image-rotating, 4-mirror ring optical parametric oscillator.

Optical parametric amplification (OPA) is a nonlinear optical process whereby light at one wavelength, the pump wavelength, is used to generate light at two other (longer) wavelengths in a nonlinear optical material with a nonvanishing second order nonlinear susceptibility. Optical gain is established at two wavelengths, conventionally referred to as the signal and idler wavelengths. The sum of the energies of a signal photon and an idler photon are equal to the energy of a pump photon. There is no fundamental physical distinction between the idler wave and the signal wave. An optical parametric oscillator (OPO) is a resonant optical cavity containing a nonlinear material which provides OPA when pumped by a beam of laser radiation at a pump frequency from a pump source.

The content and orientation of the crystal and the design of the resonant cavity determines the signal and idler frequencies. The gain within the nonlinear medium combined with feedback within the resonant cavity permits oscillation, a process similar to build-up in a laser cavity. The cavity can either be singly resonant in which end mirrors reflect only the signal frequency or doubly resonant in which end mirrors reflect both signal and idler frequencies. End mirrors of the OPO are often transparent to the pump frequency, although they reflect the pump in some designs. OPOs with singly resonant cavities are typically more stable in their output than OPOs with doubly resonant cavities.

A schematic diagram of a prior art OPO appears in FIG. 1 (e.g., see Alford et al., U.S. Pat. No. 6,147,793, issued on Nov. 14, 2000). The pump 10 provides a source of intense coherent radiation in the form of the pump wave 14. A suitable nonlinear optical material 13 is placed in the optical cavity formed by mirrors 11 and 12. Mirror 11 is essentially transparent to pump wave 14, thereby providing a pump source to nonlinear optical material 13. Mirror 12 is partially transparent to the signal wave 16, which along with the idler wave 15 is generated by nonlinear interaction of pump wave 14 with nonlinear optical material 13. For simplicity, FIG. 1 shows all three waves propagating along a phasematch or quasi-phasematch direction within nonlinear optical material 13, a situation known as collinear phase matching. More generally, collinearity of the three waves is not required for OPO function.

An average photon from signal wave 16 makes multiple passes through nonlinear optical medium 13 before escaping from the optical cavity through mirror 12. Such apparatus can provide reasonably efficient (10–40%) conversion of pump photons into signal photons. Like excited optical laser media, OPA involves optical gain and amplification of light. In laser media, however, there is no fundamental relationship between the coherence or lack thereof of the excitation energy and the laser radiation. In contrast, in OPA the pump source must be coherent light, and the output energy is coherently coupled and phase-locked to the laser pump.

To obtain a useful device, it is necessary to be able to choose a specific signal wavelength. This is made possible within the nonlinear material itself, as useful gain appears only when the pump wave, the signal wave, and the idler wave can propagate and stay in phase with each other. This phase matching condition is difficult to establish. Optical materials generally exhibit a property called dispersion, in which the refractive index varies with wavelength. Normally, shorter wavelength light propagates more slowly than do longer wavelengths. Consequently, as waves with different frequencies propagate, they rapidly move in and out of phase with each other. The resulting interference prevents the signal wave from experiencing significant optical gain. The most common ways of phase matching are to take advantage of birefrigence often present in nonlinear crystals or to quasi-phase match by periodically changing the orientation of the nonlinear crystal to periodically rephase the pump, signal, and idler waves.

Because of constraints imposed by crystal nonlinearities and damage thresholds, scaling a pulsed OPO from low to high energy implies increasing the beam diameters while keeping the fluences, crystal lengths, and cavity length relatively unchanged. The result is a high-Fresnel-number ($N_F$, where $N_F = d^2/\lambda L$; d is the beam diameter, $\lambda$ is the frequency and L is the cavity length) cavity that can support many transverse modes, often resulting in poor beam quality.

Beams from OPO's with small Fresnel numbers are often nearly diffraction limited because diffraction couples all transverse regions of the beams. However, as the beam diameters are increased to large Fresnel numbers, different portions of the beams uncouple and develop more or less independently of one another in cavities with flat mirrors. This allows uncorrelated phase and amplitude variations across the beam profile, resulting in poor beam quality. To improve the beam quality, all regions of the signal and idler beams must communicate in a way that establishes a more uniform phase and amplitude across the beams. One way to do this is to use a confocal unstable resonator (Clark et al., U.S. Pat. No. 5,390,211, issued on Feb. 14, 1995). Light originally oscillating near the cavity axis gradually spreads over the entire beam diameter by diffraction and cavity magnification. Light is also continuously lost from the edges of the gain region for the same reasons, so after a few round trips of the cavity all the resonated light has a common ancestry and, for proper cavity alignment, a common phase.

Another optical parametric oscillator system that provides an improved beam is described by Nabors et al. (U.S. Pat. No. 5,781,571, issued on Jul. 14, 1998), utilizing an elongated resonant cavity with an output coupling device at one end and a Porro prism at the opposite end. Hansson et al. (G. Hansson, H. Karlson, and F. Laurell, 2001, Appl. Opt., 40, 5446–5451) and Johnson et al. (B. Johnson, V. Newell, J. Clark, and E. McPhee, 1995, J. Opt. Soc. Am. B, 12, 2122–2127) describe confocal unstable resonators to improve beam quality.

Anstett et al. (G. Anstett, G. Goritz, D. Kabs, R. Urschel, R. Wallenstein, and A. Borsutzky, 2001, Appl. Phys. B., DOI 10.1007) describe a method for reducing beam divergence using collinear type-II phase matching and back reflection of the pump beam. Alford et al. (U.S. Pat. No. 6,147,793, issued on Nov. 14, 2000) also describe a class of optical parametric oscillators that introduce means for reducing signal losses due to backconversion of signal photons in the nonlinear optical medium. Elimination of backconversion results in improved beam quality compared with an OPO in which backconversion is present.

Another way to communicate phase across the beam is by spatial walk off between the signal and idler beams, combined with image rotations (Smith, A. and Bowers, M., presented at University of Kaiserslautern, Kaiserslautern, Germany, May 5, 2000; incorporated herein by reference). Walk off, which describes the angle difference ρ between the signal and idler Poynting vectors in the crystal (nonlinear medium), tends to smooth the phase of the signal beam over regions that interact with a particular portion of the idler beam. For a single pass through the crystal, this is a stripe of length equal to the walk off displacement within the crystal. Over successive passes of an OPO cavity, the stripe lengthens by this amount on each pass. This leads to a set of stripes of uniform phase oriented parallel to the walk off direction but with an independent phase for each stripe.

DETAILED DESCRIPTION OF THE INVENTION

An optical parametric oscillator (OPO) is an optical device pumped by a coherent light source, such as a laser, that provides optical parametric amplificaton by generating waves (radiation) in a nonlinear medium within a resonant optical cavity. The present invention provides optical parametric amplification using a 4-mirror, nonplanar ring design to produce 90° image rotation on each round trip of the formed cavity, maintaining polarization of the resonating light. The formed cavity (or OPO) advantageously has a shorter length than most previously designed ring OPOs.

Figure 1:
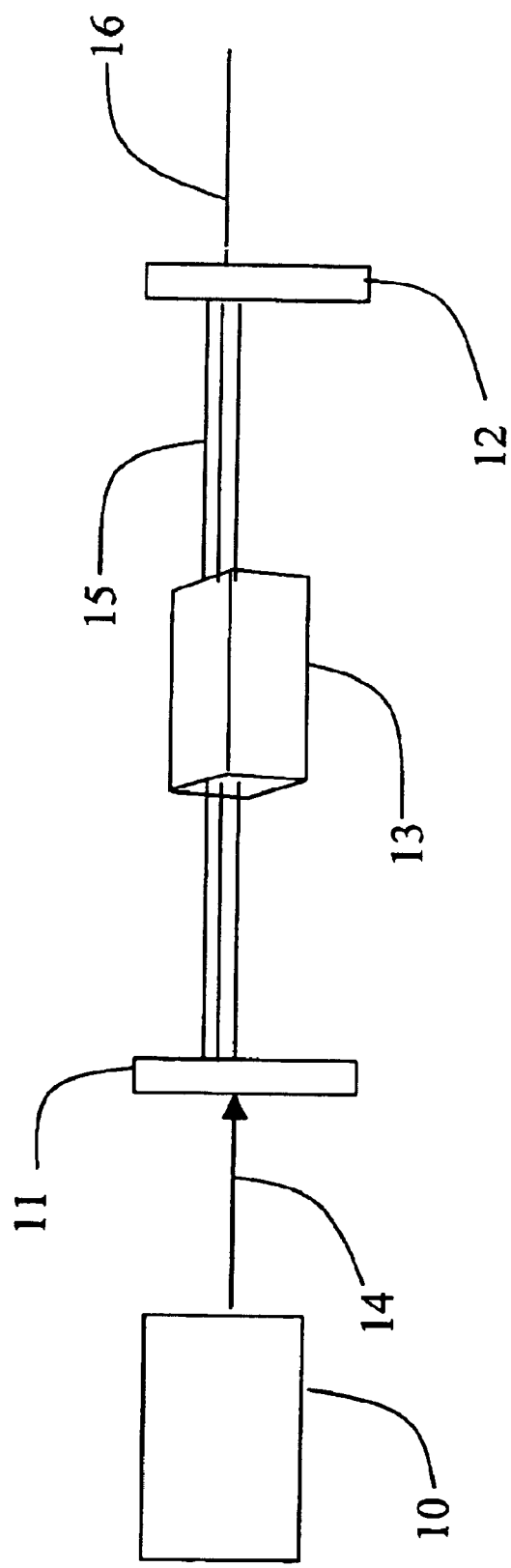
FIG. 1 illustrates a prior art optical parametric oscillator.
Figure 2:
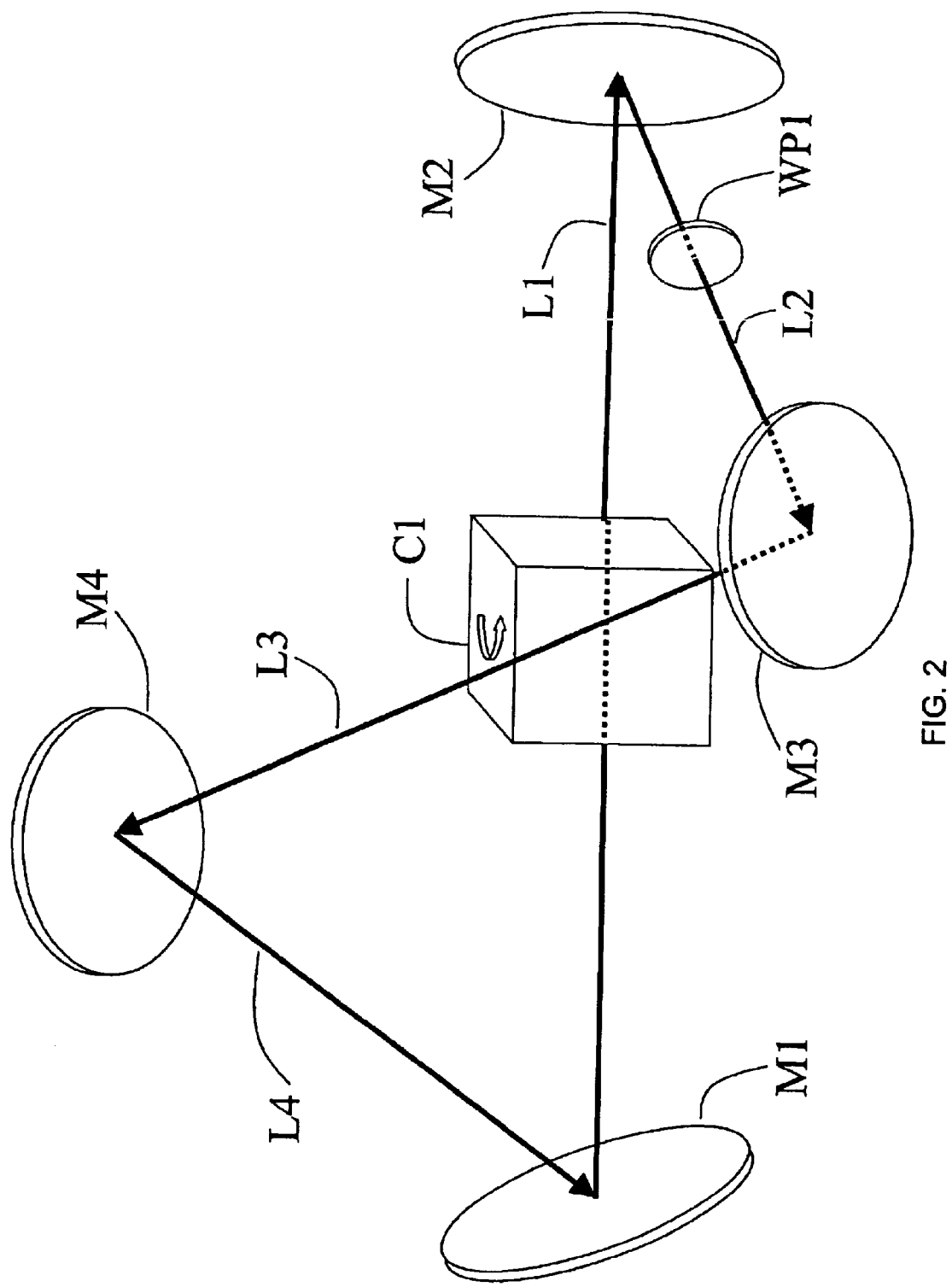
FIG. 2 illustrates one embodiment of the optical parametric oscillator of the present invention utilizing a 4-mirror, nonplanar ring configuration.

FIG. 2 illustrates one embodiment of the 4-mirror, nonplanar ring system of the present invention. The system has 4 mirrors, designated as M1, M2, M3 and M4. In general, the pump laser beam enters through a partially transmissive mirror (for example, M1) and exits through another partially transmissive mirror (for example, M2) although the other mirrors could also be used to admit and emit the pump light. Mirrors M3 and M4 are identical in order to maintain polarization with only one wave plate (WP1), a half-wave plate, situated between mirrors M2 and M3, although the wave plate could also be situated between mirrors M1 and M4. This half-wave plate is included to maintain linear polarization at the crystal. These mirrors reflect the signal wave and could also reflect the idler and pump, although this is usually undesirable because it makes signal/idler wavelength selection difficult. Situated between mirrors M1 and M2 is at least one nonlinear optical medium C1 (generally a crystal).

For the embodiment illustrated in FIG. 2, a laser beam that traverses between mirrors M1 and M2 is defined to follow a laser beam path designated as L1, the beam path between mirrors M2 and M3 is designated as L2, the beam path between mirrors M3 and M4 is designated L3, and the beam path between mirrors M4 and M1 is designated as L4. For the purposes of the discussion herein, the plane formed by beam paths L1 and L2 is defined as optical plane A and the plane formed by beam paths L1 and L4 is defined as optical plane B. The optical plane defined by beam paths L1 and L2 is approximately orthogonal to the optical plane formed by L4 and L1. By approximately orthogonal, it is defined as 90°±10°. The ratio of L2 (approximately equal to L4) to L1 (approximately L3) is approximately 0.707 (where approximately is defined to be within 10%). These two geometric constraints determine the cavity geometry within a length scale factor that can be varied to accommodate different beam and crystal sizes. The design of the present invention produces an image-rotating cavity that is relatively insensitive to misalignment. Slight tilt (approximately 10 mrad) of the mirrors does not misalign the optical cavity. This makes possible the achievement of a resonant monolithic cavity with no adjustments on the mirrors. Additionally, the cavity is insensitive to mechanical vibrations and temperature changes compared with non-rotating cavities.

Suitable nonlinear optical media materials include $KTiOPO_4$ (KTP) and its isomomphs, $KH_2PO_4$ (KDP) and its isomorphs, $LiNbO_3$ and its isomorphs, potassium pentaborate tetrahydrate (KB5) and its isomorphs, lithium formate (LFM) and its isomorphs, $Ca_4GdO(BO_3)_3$ and its isomorphs, Se, Te, III–V semiconductors, II–VI semiconductors, semiconductor quantum-well materials, HgS (cinnabar), quartz, $Ag_3AsS_3$ (proustite) and its isomorphs, $LiB_3O_5$, $Li_2B_4O_7$, $KBe_2BO_3F_2$, $\beta$-$BaB_2O_4$, $AgGaS_2$, $\alpha$-$HIO_3$, $BaSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$ and its isomorphs, $CsLiB_6O_{10}$, urea, cesium dihydroarsenate and L-arginine phosphate. The instant invention can be implemented using any of the above materials, and any other nonlinear optical materials having suitable properties.

Figure 3:
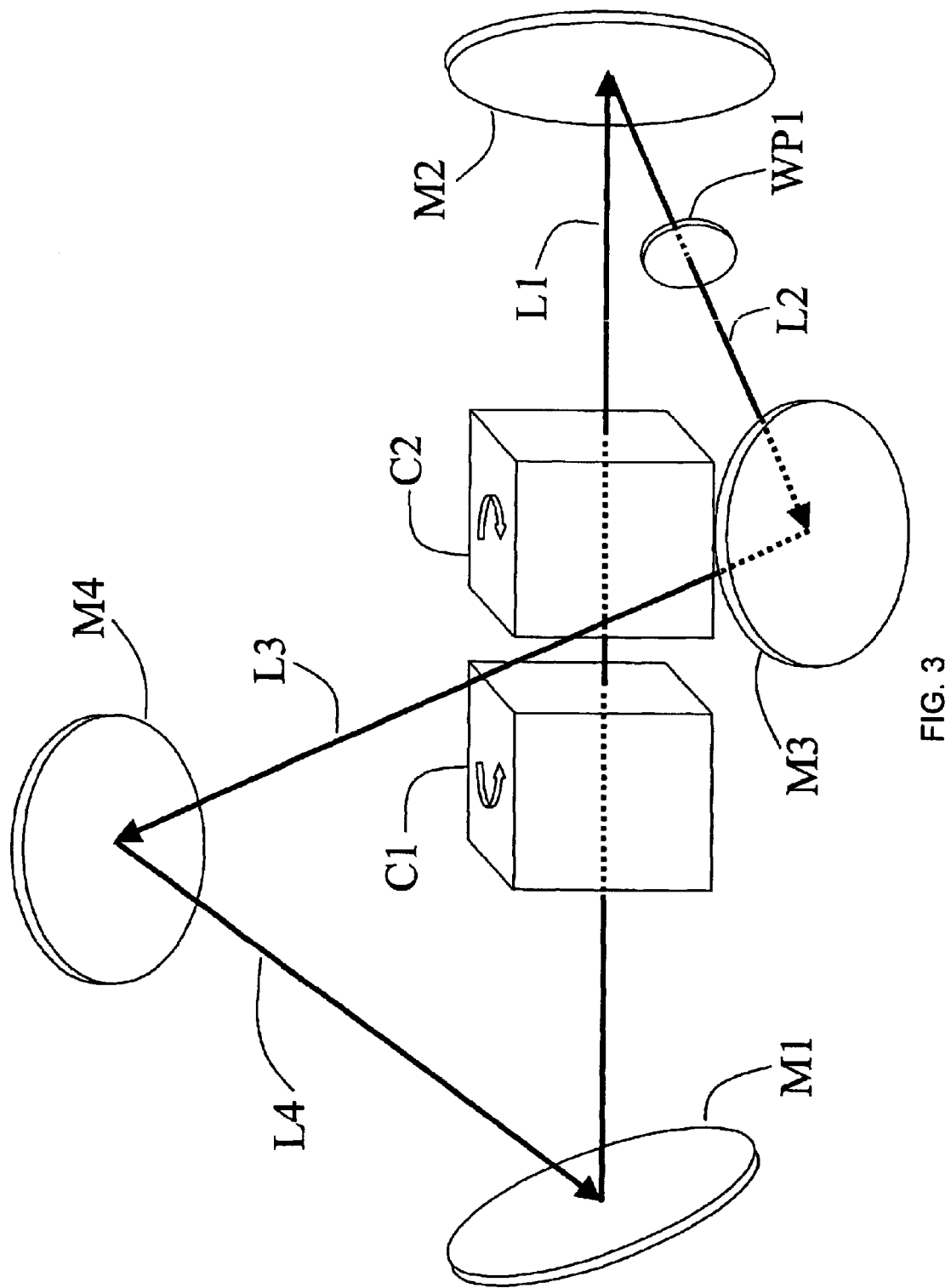
FIG. 3 illustrates one embodiment of the optical parametric oscillator of the present invention utilizing a 4-mirror, nonplanar ring configuration with multiple crystals.

In another embodiment, multiple crystals are situated between M1 and M2 to walkoff compensate for broad tunability. Two identical crystals C1 and C2 can be used, situated side-by-side, as shown in FIG. 3. For a crystal size of approximately 10 mm×10 mm×15 mm, a cavity length of only approximately 105 mm was achieved. The distance for L1 was 31 mm. The distance for L2 was 22 mm. The distance for L3 was 31 mm. The distance for L4 was 22 mm. The crystals were 15-mm long KTP crystals. The mirrors were all 33° angle of incidence. The beam had pump, signal and idler wavelengths of 532 nm, 800 nm, and 1588 nm, respectively, with a $1/e^2$ pump beam diameter of 2.1 mm. A conversion efficiency of approximately 45% was achieved. In the operation of the configuration of the present invention to produce an optical parametric oscillator, an optical pump (such as a pump laser, as a nanosecond pulsed laser, and more particularly, a Q-switched solid state laser) generates a pump beam B (wave) with a suitable intensity at a pump frequency greater than a desired signal frequency. The pump beam B passes through a first mirror (M1) that directs the beam through a nonlinear optical medium (in this case, crystals C1 and C2) subsequently is directed by a second mirror M2 through a wave plate WP1 to a third mirror M3 that directs the beam back to mirror M4. All mirrors are at least partially reflective to the signal beam to allow multiple passes in the optical cavity. The waveplate aligns the beam polarization to avoid depolarization.

In another embodiment, one or two crystals can also be situated between M3 and M4 to increase gain. Such a system would require an additional half-wave plate to be situated in L4. Both half-wave plates are rotated to approximately 22.5° instead of 45° to maintain linear polarizations for both crystals.

The necessary image rotation angle of the nonplanar ring cavity for the system configuration of the present invention was determined by first developing the mathematical formalism for mirror reflections and then applying it to a nonplanar ring. The rotation angle was calculated from the area bounded by great arcs connecting propagation directions on a unit sphere. For the configuration depicted in FIG. 3, various configurations of crystals and beam entry and exit points are possible for the resulting OPO. The simplest is with the nonlinear crystal or crystals situated between mirrors M1 and M2, with the beam entering through M1 and ultimately exiting through M2. Mirror M2 is the signal output coupler, and the other three mirrors are high reflectors for the signal and low reflectors for the idler. The nonlinear crystals are oriented so the eigen polarizations of the crystal and the cavity lie in the horizontal and vertical planes. Starting at the crystal and following a horizontally polarized signal wave around the cavity, the half-wave plate in L2 changes the polarization to vertical. Mirrors M1, M3, and M4 rotate the polarization in the same fashion as they rotate the image because of the cancellation of phase shifts between M2 and M3; hence, the polarization is rotated back to horizontal after mirror M1. After one trip around the cavity, the horizontally polarized wave returns as a horizontally polarized wave.

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

We claim:

1. A device for optical parametric amplification, comprising:

a nonlinear optical medium oriented between and collinear with a first mirror, $M_1$, and a second mirror $M_2$, with a laser beam path, L1, between mirror M1 and mirror M2;

a third mirror M3, with a laser beam path, L2, between mirror M2 and mirror M3;

a fourth mirror M4, with a laser beam path, L3, between mirror M3 and mirror M4, and a laser beam path, L4, between mirror M4 and M1, with an optical plane formed by said laser beam path L1 and laser beam path L2 approximately orthogonal to an optical plane formed by said laser beam path L1 and laser beam path L4, wherein a resonant optical cavity is formed for optical parametric amplification; and a waveplate collinearly oriented in the laser beam path selected from the group consisting of laser beam path L2 and laser beam path L4.

2. The device of claim 1 further comprising an optical pump, which generates a pump beam.

3. The device of claim 1 wherein the length of laser beam path L2 is approximately equal to L4, the length of laser beam path L1 is approximately equal to L3, and the ratio of the length of laser beam path L2 to the length of laser beam path L1 is approximately 0.707.

4. The device of claim 2 wherein the optical pump is a pump laser.

5. The device of claim 4 wherein the pump laser is a nanosecond pulsed laser.

6. The device of claim 4 wherein the pump laser is a Q-switched solid state laser.

7. The device of claim 1 wherein the nonlinear optical medium comprises a material selected from $KTiOPO_4$, $KH_2PO_4$, $LiNbO_3$, potassium pentaborate tetrahydrate, lithium formate, $Ca_4GdO(BO_3)_3$, Se, Te, III–V semiconductors, II–VI semiconductors, semiconductor quantum-well materials, HgS, quartz, $Ag_3AsS_3$, $LiB_3O_5$, $Li_2B_4O_7$, $KBe_2BO_3F_2$, $\beta$-$BaB_2O_4$, $AgGaS_2$, $\alpha$-$HIO_3$, $BaSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$, $CsLiB_6O_{10}$, urea, cesium dihydroarsenate and L-arginine phosphate.

8. The device of claim 1 further comprising at least one additional nonlinear optical medium situated between and collinear with mirror M1 and mirror M2.

9. The device of claim 1 further comprising a nonlinear optical medium situated between and collinear with mirror M3 and mirror M4 and a waveplate situated in said laser beam path L4.

10. A device for optical parametric amplification, comprising:

a nonlinear optical medium of approximately 15 mm in length, oriented between and collinear with a first mirror, $M_1$, and a second mirror $M_2$, with a laser beam path, L1, of approximately 31 mm, between mirror M1 and mirror M2;

a third mirror M3, with a laser beam path, L2, of approximately 22 mm, between mirror M2 and mirror M3;

a fourth mirror M4, with a laser beam path, L3, of approximately 31 mm, between mirror M3 and mirror M4, and a laser beam path, L4, of approximately 22, between mirror M4 and M1, with an optical plane formed by said laser beam path L1 and laser beam path L2 approximately orthogonal to an optical plane formed by said laser beam path L1 and laser beam path L4, wherein a resonant optical cavity with a cavity length of less than 110 mm, is formed for optical parametric amplification; and a waveplate collinearly oriented in the laser beam path selected from the group consisting of laser beam path L2 and laser beam path L4.

11. The device of claim 10 wherein the nonlinear optical medium comprises a material selected from $KTiOPO_4$, $KH_2PO_4$, $LiNbO_3$, potassium pentaborate tetrahydrate, lithium formate, $Ca_4GdO(BO_3)_3$, Se, Te, III–V semiconductors, II–VI semiconductors, semiconductor quantum-well materials, HgS, quartz, $Ag_3AsS_3$, $LiB_3O_5$, $Li_2B_4O_7$, $KBe_2BO_3F_2$, $\beta$-$BaB_2O_4$, $AgGaS_2$, $\alpha$-$HIO_3$, $BaSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$, $CsLiB_6O_{10}$, urea, cesium dihydroarsenate and L-arginine phosphate.

12. The device of claim 10 wherein said mirrors have an angle of incidence of approximately 33°.

13. The device of claim 10 wherein the waveplate is rotated to approximately 22.5°.

* * * * *